UNITED STATES PATENT OFFICE.

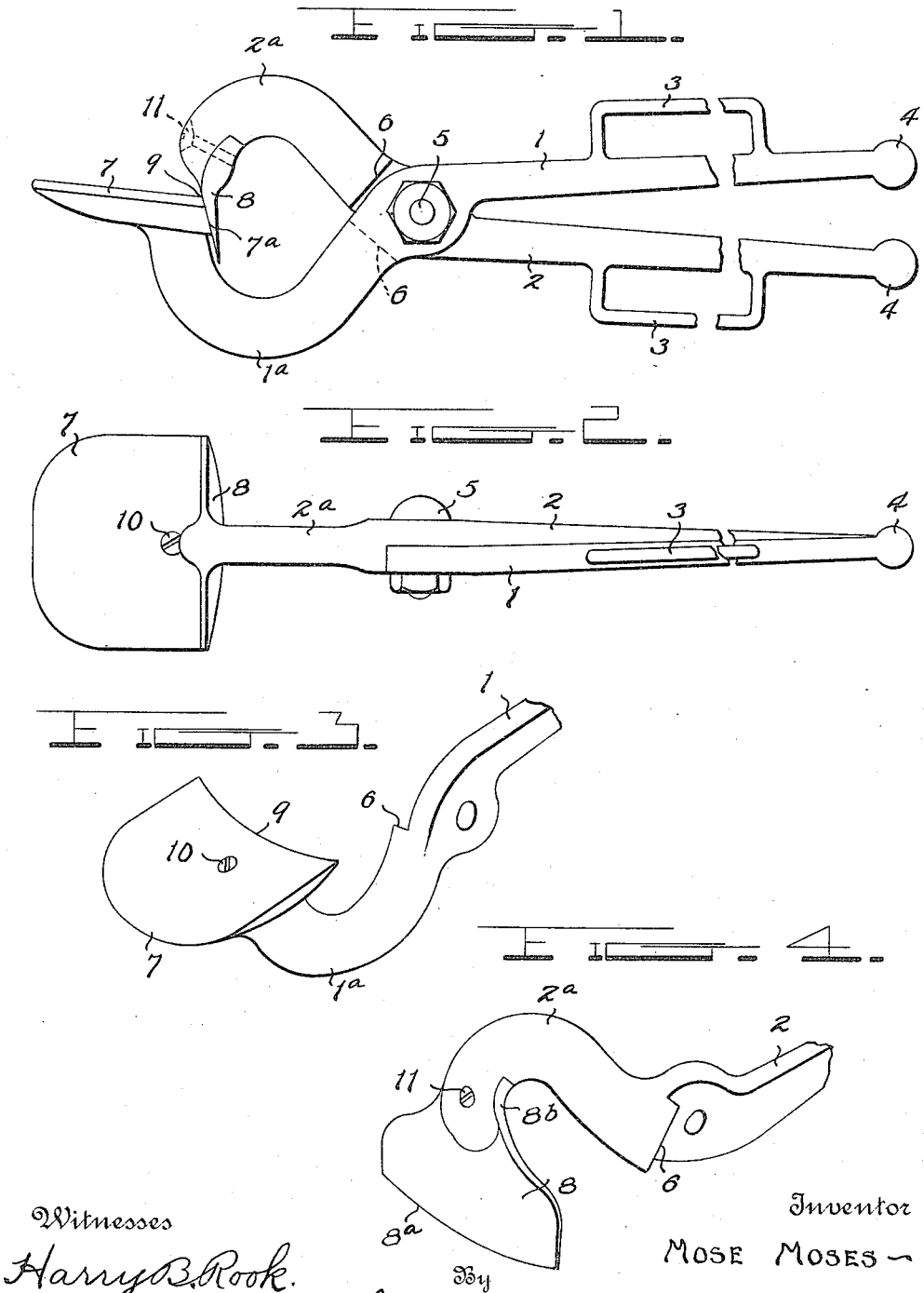

MOSE MOSES, OF JACKSON, TENNESSEE, ASSIGNOR OF ONE-THIRD TO WILLIS F. ARNOLD AND ONE-THIRD TO JOE S. ATKINS, BOTH OF JACKSON, TENNESSEE.

HORSE-HOOF-PARING KNIFE.

1,162,872.

Specification of Letters Patent.

Patented Dec. 7, 1915.

Application filed July 2, 1914. Serial No. 848,589.

*To all whom it may concern:*

Be it known that I, MOSE MOSES, citizen of the United States, residing at Jackson, in the county of Madison and State of Tennessee, have invented certain new and useful Improvements in Horse-Hoof-Paring Knives, of which the following is a specification.

The present invention relates in general to farriers' tools, and more particularly to a hoof pairing instrument which embodies novel features of construction whereby the bottom of the hoof may be readily cleaned preparatory to applying a shoe, without danger of breaking or tearing the horny substance of which the hoof is composed.

A further object of the invention is to provide a hoof paring knife which is comparatively simple and inexpensive in its construction, which can be readily applied to a hoof, and which holds the knife edge in proper position so that the hoof can be accurately pared without danger of the knife edge slipping and causing injury.

With these and other objects in view, the invention consists in certain novel combinations and arrangements of the parts as will more fully appear as the description proceeds, the novel features thereof being pointed out in the appended claim.

For a full understanding of the invention, reference is to be had to the following description and accompanying drawing, in which:—

Figure 1 is a side elevation of a horse hoof paring knife constructed in accordance with the invention, portions of the handles being broken away. Fig. 2 is a top plan view of the same, portions of the handles being broken away. Fig. 3 is a detail perspective view of the concave hoof engaging plate at the end of one of the complemental lever members. Fig. 4 is a similar view of the knife member at one end of the other complemental lever member.

Corresponding and like parts are referred to in the following description and indicated in all the views of the drawing by the same reference characters.

Specifically describing the present embodiment of the invention, the numerals 1 and 2 designate a pair of complemental lever members which provide handles for use in manipulating the tool. These complemental lever members may be provided with suitable hand receiving loops or keepers 3, and are shown as terminating at the rear ends thereof in balls or knobs 4. The levers 1 and 2 are pivotally connected by means of a suitable pin or bolt 5 and the respective forward ends 1$^a$ and 2$^a$ of the levers have oppositely extending substantially U-shaped bends therein. It will also be observed that the forward ends 1$^a$ and 2$^a$ of the lever members have a greater thickness than the handles 1 and 2, the handles being slightly offset from the forward ends of the levers and shoulders 6 being provided adjacent the pivot pin 5 so that the curved forward ends 1$^a$ and 2$^a$ of the lever members are disposed in substantially the same plane. By reference to Fig. 2 it will also be seen that the rear ends of the handles 1 and 2 are slightly inclined toward each other so that when the tool is in an upright position the knobs or balls 4 are directly over each other and in the same plane with the oppositely curved forward ends 1$^a$ and 2$^a$ of the lever members.

The extremity of the curved end 1$^a$ of the lever member 1 is provided with a concaved plate 7 which extends substantially longitudinal of the tool, while the extremity of the curved end 2$^a$ of the lever member 2 carries a knife member 8 which extends transversely of the tool. The concave plate 7 is curved to conform to the sides of the horse's hoof and is designed to be fitted against the same with the heel thereof at the bottom of the hoof. The plate is of sufficient size to obtain a firm bearing upon the hoof and tapers in thickness toward the rounded upper end thereof, while the heel 7$^a$ of the plate is cut off squarely in the plane of the knife 8 and provides a shearing edge 9 for coöperation therewith. This concave plate 7 may be either formed integral with the lever member 1 or, as shown by the present instance, constructed as a separate element and detachably applied thereto by some suitable fastening member such as the screw 10.

The knife member 8 has a width corresponding to the width of the concave hoof engaging plate 7 and is provided with a cutting edge 8$^a$ adapted to coöperate with the shearing edge 9 of the plate 7 and having a curvature corresponding to the concave formation of the plate 7. This knife 8 may either be formed integral with the lever member 2 or, as is shown in the present instance, provided with a shank 8ᵇ which fits within a suitable recess within the extremity of the curved end 2ᵃ of the lever 2 and is secured in position by a suitable fastening member such as the screw 11.

In the use of the instrument the concave face of the hoof engaging plate 7 is placed firmly against the side of the horse's hoof with the shearing edge 9 at the bottom of the horse's hoof. When the levers 1 and 2 are now brought together, the cutting edge 8ᵃ of the knife member 8 will coöperate with the shearing edge 9 of the plate 7 to trim the hoof accurately in the required manner. The plate 7 has a considerable width so as to obtain a firm bearing surface upon the hoof and the knife member is thus placed absolutely under the control of the operator so that the hoof is pared in the desired manner without any danger of the knife slipping and causing injury. Furthermore, the plate 7 bears firmly against the sides of the horse's hoof so as to prevent breaking or tearing of the edges of the hoof while trimming the same. It will thus be obvious that owing to the construction of the tool the hoof can be accurately trimmed exactly as required without any danger of injury either to the animal or operator, and without danger of tearing and breaking the hoof.

Having thus described the invention, what I claim as new and desire to secure by Letters Patent, is:—

The herein described horse hoof paring implement including a pair of complemental lever members pivotally connected at an intermediate point in their length, the rear ends of the lever members providing handles while the forward ends thereof are bent to provide opposed U-shaped jaws, a longitudinally extending and transversely concaved hoof engaging plate detachably fitted to the extremity of one of the jaws, said concave plate being of sufficient size to obtain a firm bearing upon the hoof and terminating at the inner end thereof in a transversely disposed shearing edge, and a transversely disposed coöperating knife detachably applied to the extremity of the opposite jaw, said knife having a width corresponding to the width of the hoof engaging plate and being formed with a cutting edge which is curved to conform to the curvature of the shearing edge of the hoof engaging plate.

In testimony whereof I affix my signature in presence of two witnesses.

MOSE MOSES.

Witnesses:
WILLIS F. ARNOLD,
JOE S. ATKINS.